(12) United States Patent
Murthy et al.

(10) Patent No.: US 12,155,326 B2
(45) Date of Patent: Nov. 26, 2024

(54) SYSTEM AND METHOD OF WIPER ELECTRIC DRIVE CONTROL USING FOUR QUADRANT OPERATION

(71) Applicant: Rosemount Aerospace Inc., Burnsville, MN (US)

(72) Inventors: Muthukumar Murthy, Bangalore (IN); Ashok Kumar Thirunarayana, Karnataka (IN); Srividya Aryasomayajula, Karnataka (IN); Rohini Kundanagar, Bangalore (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 207 days.

(21) Appl. No.: 18/052,778

(22) Filed: Nov. 4, 2022

(65) Prior Publication Data
US 2023/0163707 A1 May 25, 2023

(30) Foreign Application Priority Data

Nov. 23, 2021 (IN) .............................. 202141053856

(51) Int. Cl.
*H02P 21/36* (2016.01)
*B64C 1/14* (2006.01)
*H02P 21/18* (2016.01)
*H02P 21/22* (2016.01)
*H02P 27/12* (2006.01)

(52) U.S. Cl.
CPC ............ *H02P 21/36* (2016.02); *B64C 1/1484* (2013.01); *H02P 21/18* (2016.02); *H02P 21/22* (2016.02); *H02P 27/12* (2013.01)

(58) Field of Classification Search
CPC ..... B60S 1/08; B60S 1/48; B60S 1/50; B61D 25/00; B61L 3/006; H02P 21/36; H02P 21/18; H02P 21/22; H02P 27/12; B64C 1/1484
See application file for complete search history.

(56) References Cited

U.S. PATENT DOCUMENTS

| 5,404,085 A | 4/1995 | Resch et al. |
| 6,876,163 B2 | 4/2005 | Zack et al. |
| 6,917,173 B2 | 7/2005 | Takagi |

(Continued)

FOREIGN PATENT DOCUMENTS

| CN | 110829906 A | 2/2020 |
| EP | 0926025 A2 | 6/1999 |

(Continued)

OTHER PUBLICATIONS

WO03045744_English translation (Year: 2003).*
Extended European Search Report for EP Application No. 22209015.1, Dated Apr. 4, 2023, pp. 9.

*Primary Examiner* — Said Bouziane
(74) *Attorney, Agent, or Firm* — Kinney & Lange, P. A.

(57) ABSTRACT

A windshield wiper system includes a three-phase motor, the three-phase inverter, a brake circuit, and a controller. The controller transmits commutation signals to the three-phase inverter to drive the motor according to an inboard-to-outboard speed profile and to drive the motor according to an outboard-to-inboard speed profile. The controller activates the brake circuit based on the inboard-to outboard speed profile, or the outboard-to-inboard speed profile, and a direct current bus voltage.

14 Claims, 5 Drawing Sheets

(56) References Cited

U.S. PATENT DOCUMENTS

| | | |
|---|---|---|
| 7,268,507 B2 | 9/2007 | Kawamura |
| 9,018,877 B2 | 4/2015 | Braun et al. |
| 10,351,104 B2 | 7/2019 | De Vries et al. |
| 10,843,665 B2 | 11/2020 | De Vries et al. |
| 2011/0084638 A1 | 4/2011 | Patel et al. |
| 2019/0061696 A1 | 2/2019 | Vadgaonkar et al. |
| 2019/0337488 A1 | 11/2019 | Thirunarayana et al. |
| 2021/0175741 A1 | 6/2021 | Blank et al. |

FOREIGN PATENT DOCUMENTS

| | | | |
|---|---|---|---|
| JP | 2013001237 A | 1/2013 | |
| WO | WO-03045744 A1 * | 6/2003 | ................ B60S 1/08 |

* cited by examiner

SYSTEM AND METHOD OF WIPER ELECTRIC DRIVE CONTROL USING FOUR QUADRANT OPERATION

BACKGROUND

This application claims the benefit of India Provisional Application No. 202141053856 filed Nov. 23, 2021 for "SYSTEM AND METHOD OF WIPER ELECTRIC DRIVE CONTROL USING FOUR QUADRANT OPERATION" are hereby incorporated by reference in their entirety.

The windshield wiper system (WWS) of an aircraft is used for cleaning rain, sand, and dust from the windshield. The wiper, motor, motor drive, and in some instances, gearing components form an electro-mechanical system that reciprocates the wiper between an inboard position and an outboard position on the windshield. Characteristically, aircraft windshields are highly contoured to accommodate aerodynamics of the aircraft. One quadrant motor control systems drive the motor in a single direction, relying on friction within the system to reduce the wiper speed and a motor converter to reverse the wiper direction to achieve a reciprocating wiper motion from an unidirectional motor input. Two quadrant motor control systems drive the motor in forward and reverse directions and, as such, do not require a motor converter. In these instances, the wiper may be driven directly by the motor or via gearing. In each of these systems, wipers can be driven at fixed high and low speed setpoints. However, wiper position inaccuracies can be introduced by varying system friction and/or external aerodynamic loads on the wiper. Moreover, reversing motor direction can induce transient high current in the motor and/or the motor drive that reduces operational life of the motor and/or the motor drive.

SUMMARY

A windshield wiper system in accordance with an exemplary embodiment of this disclosure includes a three-phase motor, a three phase-inverter, a brake circuit, and a controller. The controller includes one or more processors and computer-readable memory encoded with instructions that, when executed by the processor, cause the controller to transmit commutation signals to the three-phase inverter to drive the motor according to a first speed profile associated with a first direction of motor rotation. The controller transmits commutation signals to the three-phase inverter to drive the motor according to a second speed profile associated with a second direction of motor rotation opposite the first direction of rotation. The controller activates the brake circuit to dissipate back emf produced by motor braking based on the first speed profile and the direct current bus voltage at the inverter, and based on the second speed profile and the direct current bus voltage at the inverter.

DETAILED DESCRIPTION

As disclosed herein a windshield wiper system (WWS) includes a four-quadrant motor control system that directly drives a windshield wiper of an aircraft. Using the four-quadrant motor control system, controlling the speed and position of the windshield wiper is possible in forward motoring, forward braking, reverse motoring, and reverse braking operating regimes. Inboard-to-outboard, and outboard-to-inboard, motions of the windshield wiper are governed by discrete speed profiles tailored to the curvature of the aircraft windshield, expected aerodynamic loads, and mechanical loads. A braking circuit connected between positive and negative direct current buses dissipates back emf produced during forward braking and reverse braking of the motor to protect the aircraft voltage bus. Additionally, controlling the speed and position of the wiper during braking operations reduces peak voltage experienced by the windshield wiper system during the forward-to-reverse or reverse-to-forward wiper transition so that the power is not fed back to the aircraft network and avoids noise injection.

Figure 1:
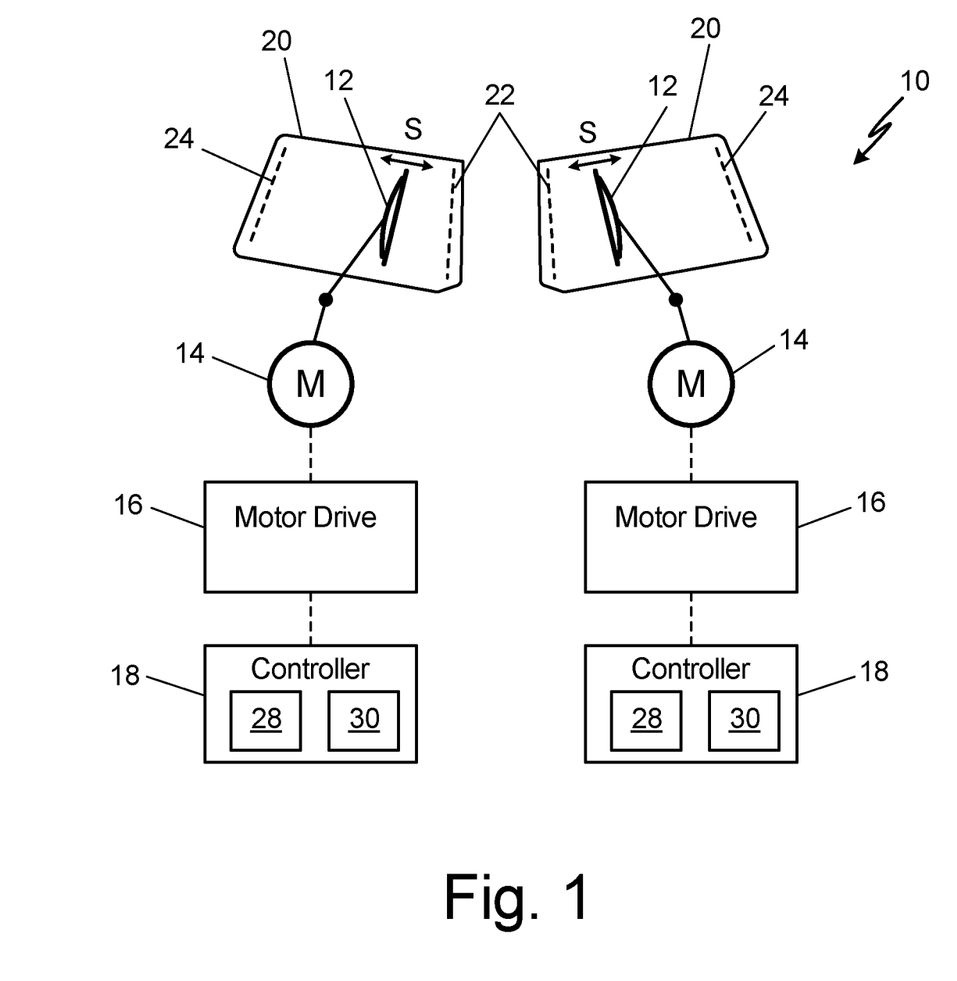
FIG. 1 is a schematic of a windshield wiper system for an aircraft.

FIG. 1 is a schematic of windshield wiper system (WWS) 10 that includes wiper 12, motor 14, motor drive 16, and controller 18. When driven by motor drive 16 and controller 18, wiper 12 traverses windshield 20 from inboard position 22 to outboard position 24, or vice versa, to define wiper sweep S. As shown in FIG. 1, windshield 20 has a curved profile to accommodate an aerodynamic shape of an aircraft. Motor 14 is a three-phase, brushless, direct current (BLDC) motor or a three-phase, permanent magnet, synchronous motor (PMSM). Motor drive 16 includes electrical circuitry used to convert a supplied direct current voltage and communication signals received from controller 18 into rotation of motor 14.

Controller 18 includes one or more processors 28 and system memory 30 that stores one or more controller routines, subroutines, algorithms, and or speed profile tables for implementing a four-quadrant control scheme of motor 14 in cooperation with motor drive 16. Using a four-quadrant control architecture, motor drive 16 and controller 18 regulate rotational speed and three-phase current delivery to motor 14 during forward motoring operation (quadrant 1), forward braking operation (quadrant 2), reverse motoring operation (quadrant 3), and reverse braking operation (quadrant 4).

During forward motoring and reverse motoring operations, the direction of motor rotation coincides with a direction of applied torque. Contrastingly, the direction of motor rotation opposes a direction of applied torque during forward braking and reverse braking. As used herein, the "forward" and "reverse" directions of motor 14 correspond inboard-to-outboard sweep of wiper and outboard-to-inboard sweep of the wiper, respectively. However, the "forward" and "reverse" designations of motor 14 are arbitrary, the techniques disclosed below being equally applicable to opposite designations.

Processor 28 executes the motor control algorithm described in further detail below. Examples of processor 28 can include any one or more of a microprocessor, a controller, a digital signal processor (DSP), an application specific integrated circuit (ASIC), a field-programmable gate array (FPGA), or other equivalent discrete or integrated logic circuitry.

System memory 30 can be configured to store information within controller 18 during operation as well as speed profile data and any associated calibration data necessary for proper function of windshield wiper system 10. System memory 30, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). System memory 30 can include volatile and non-volatile computer-readable memories. Examples of volatile memories can include random access memories (RAM), dynamic random-access memories (DRAM), static random-access memories (SRAM), and other forms of volatile memories. Examples of non-volatile memories can include, e.g., magnetic hard discs, optical discs, flash memories, or forms of electrically programmable memories (EPROM) or electrically erasable and programmable (EEPROM) memories.

In some examples, processor 28 and system memory 30 are collocated in a control unit, which itself can be collocated with other components of the windshield system 10. In other examples, any one or more components and/or described functionality of controller 18 can be distributed among multiple hardware units. For instance, in some examples, controller 18 can be incorporated into an aircraft control module designed to perform functions other than those required by the windshield wiper system 10. In other examples, controller 18 can be a module discrete from other aircraft control modules, which may be collocated with or remote from these other aircraft control modules and/or other components of the windshield wiper system 10. In general, though illustrated and described below as an integrated hardware unit, it should be understood that controller 18 can include any combination of devices and components that are electrically, communicatively, or otherwise operatively connected to perform functionality attributed herein to controller 18.

Figure 2:
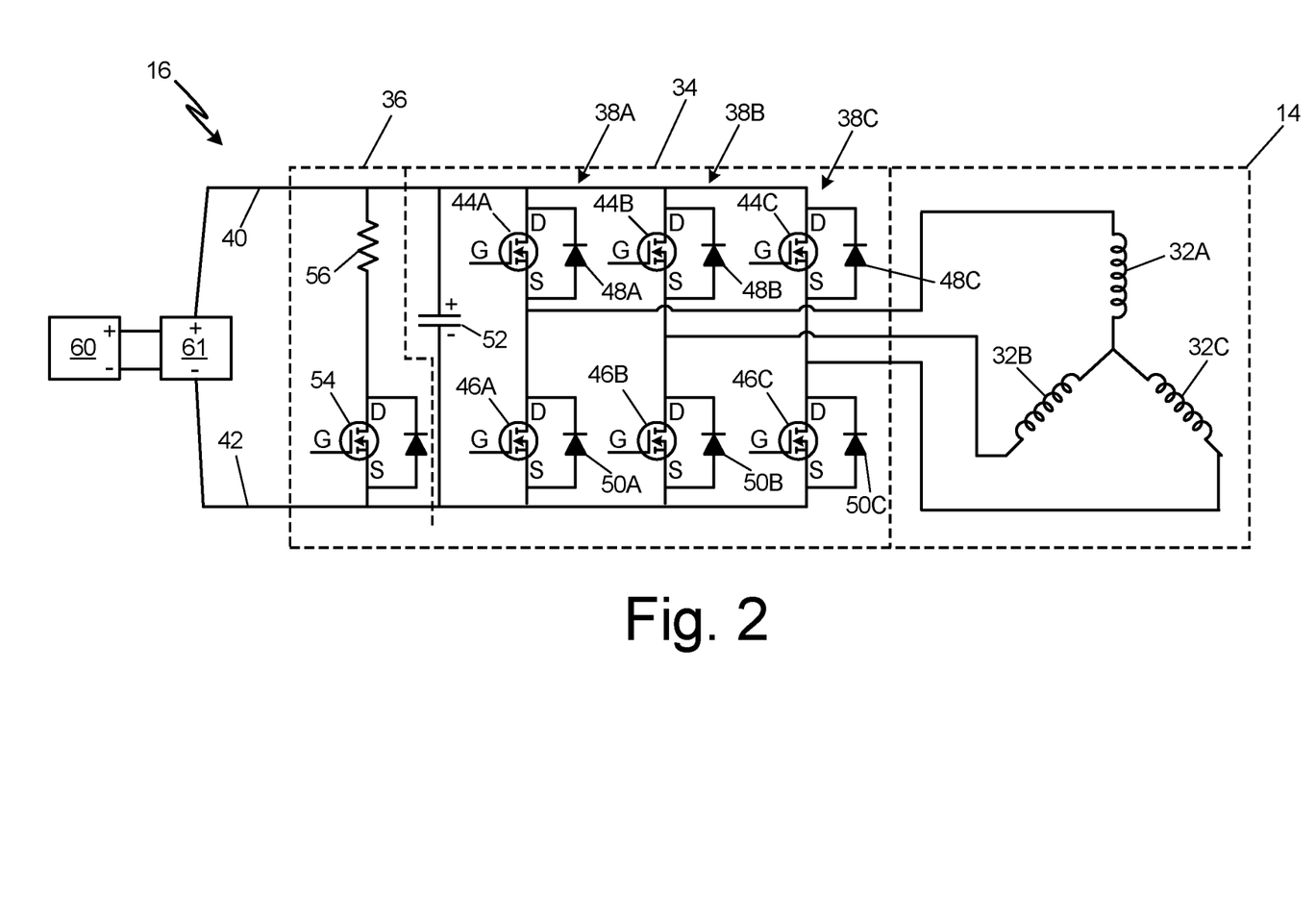
FIG. 2 is a diagram depicting motor drive components of the windshield wiper system.

FIG. 2 is a schematic of the motor 14 and motor drive components 16 of windshield wiper system 10. As shown by FIG. 2, motor 14 includes first phase 32A, second phase 32B, and third phase 32C arranged in a wye configuration. Motor drive 16 includes three-phase inverter 34 and break circuit 36.

Three-phase inverter 34 includes three half bridges 38A, 38B, and 38C connected in parallel between positive direct current bus 40 and negative current bus 42. Phases 32A, 32B, and 32C of motor 14 are connected to respective half bridges 38A, 38B, and 38C between respective high-side power switches 44A, 44B, and 44C and low-side power switches 46A, 46B, and 46C. High-side power switches 44A, 44B, and 44C connect between positive direct current bus 40 and phases 32A, 32B, and 32C while low-side power switches 46A, 46B, and 46C connect between negative direct current bus 42 and phases 32A, 32B, and 32C. Each high-side power switch 44A, 44B, and 44C and each low-side power switch 46A, 46B, and 46C are connected in parallel with one of free-wheeling diodes 48A, 48B, and 48C and free-wheeling diodes 50A, 50B, and 50C, each diode 50A-50C arranged to permit current to bypass high-side power switches 44A, 44B, and 44C from one of phases 32A, 32B, and 32C to positive direct current bus 40 and each diode 50A-50C arranged to permit current to bypass low-side power switches 46A, 46B, and 46C from negative direct current bus 38 to one of phases 32A, 32B, and 32C.

Three-phase inverter 34 additionally includes capacitor 52 connected between positive direct current bus 40 and negative direct current bus 42.

Brake circuit 36 includes brake power switch 54 and resistor 56 connected in series between positive direct current bus 40 and negative current bus 42. Like high-side and low-side power switches, diode 58 is connected in parallel with brake power switch 54, permitting current to flow from negative direct current bus 38 to positive direct current bus 36 via resistor 52, bypassing brake power switch 54.

High-side power switches 44A-44C, low-side power switches 46A-46C, and brake power switch 54 are depicted as MOSFETs in FIG. 2. However, one or more of these power switches can be insulated gate bipolar transistors (IGBTs), silicon carbide (SiC) gate drivers, or another suitable power switch.

Positive direct current bus 40 and negative direct current bus 42 are connected to voltage source 60 via pulse width modulation (PWM) generator 61. Voltage source 60 is any suitable voltage source provided within an aircraft. High-side power switches 44A, 44B, and 44C, low-side power switches 46A, 46B, and 46C, and brake power switch 54 are connected to controller 18 to receive gate signals in accordance with the motor control algorithm disclosed herein.

Figure 3A:
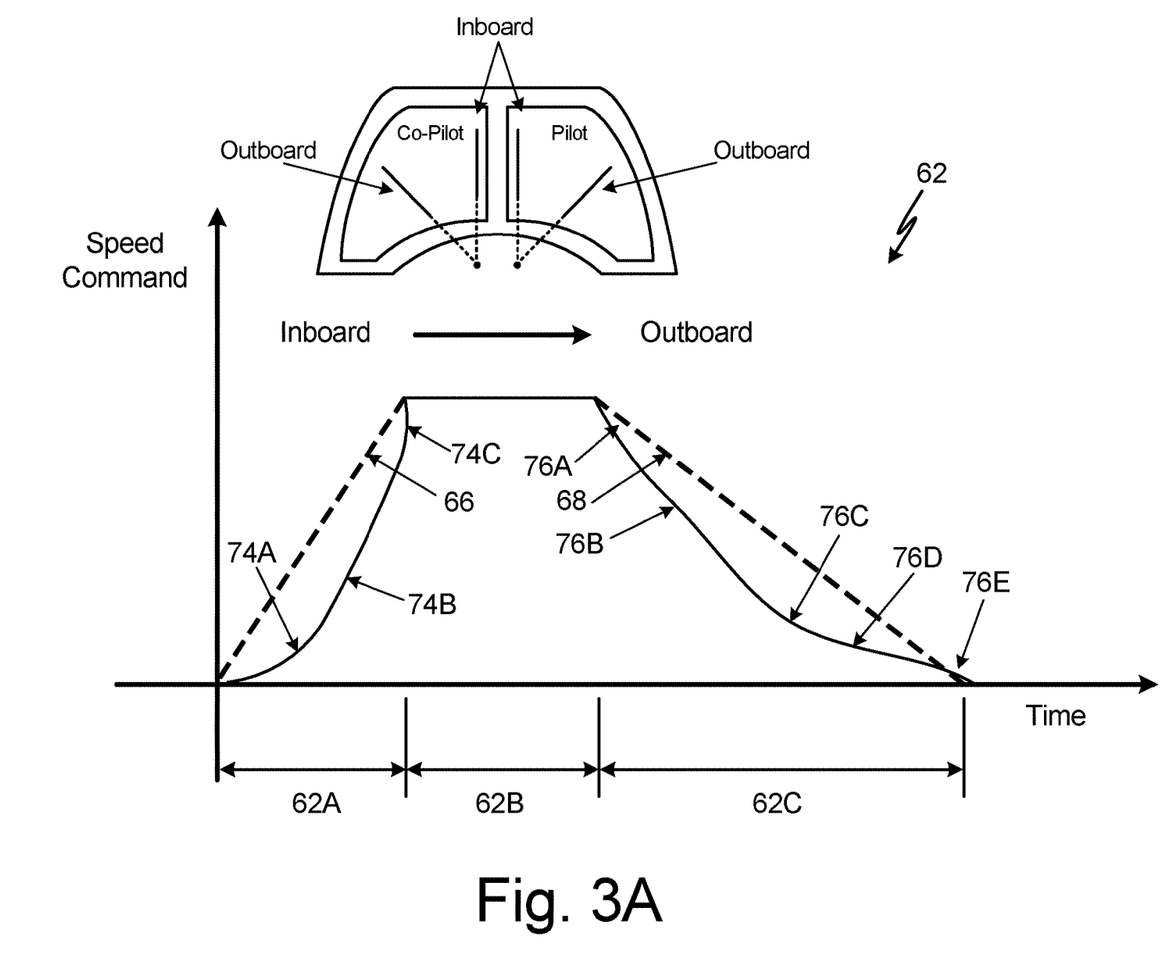
FIG. 3A is an exemplary inboard-to-outboard speed profile for a motor driving the windshield wiper.
Figure 3B:
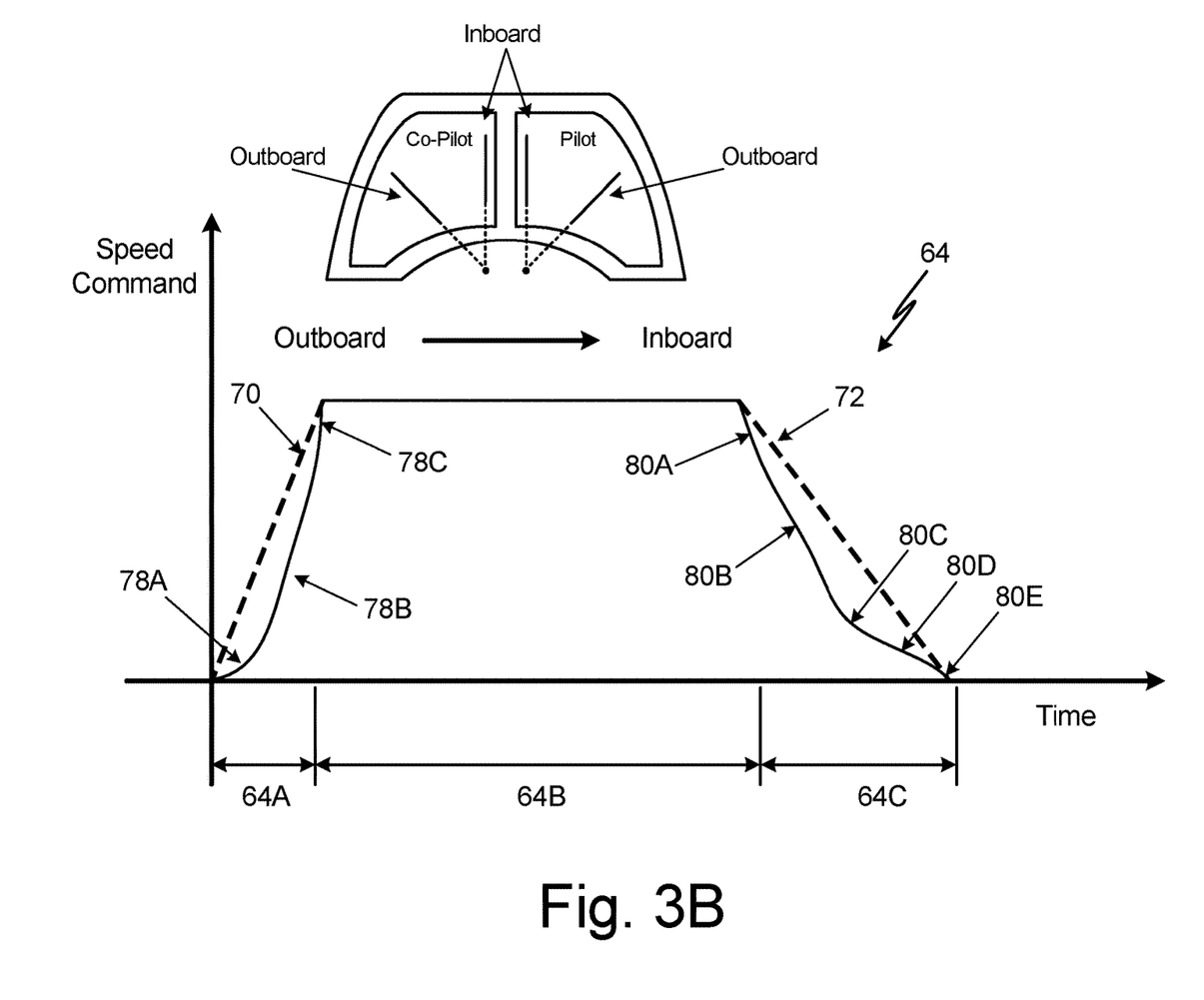
FIG. 3B is an exemplary outboard-to-inboard speed profile for a motor driving the windshield wiper.

FIG. 3A is a diagram illustrating speed profile 62 for windshield system 10 as wiper 12 traverses from inboard position 22 to outboard position 24. FIG. 3B is a diagram illustrating speed profile 64 for windshield system 10 as wiper 12 traverse from outboard position 24 to inboard position 22. In each case, profiles 62 and 64 express the desired or target rotational speed (i.e., angular velocity) of motor 14 as a function of time (i.e., seconds). Alternatively, speed profiles 62 and 64 can be expressed as a function of angular position of motor 14. Speed profiles 62 and 64 are each nonzero angular velocity distributions that start and end at rest (i.e., angular velocity $\omega=0$). The starting position and ending position coincide with inboard position 22 and outboard position 24 of wiper 12 depending on the direction the wiper travels across the windshield. Furthermore, speed profiles 62 and 64 are entirely positive angular velocity or entirely negative angular velocity such that the motor and the wiper do not reverse direction between inboard position 22 and outboard position 24.

Speed profile 62 includes acceleration phase 62A, constant speed phase 62B, and a deceleration phase 62C. During acceleration phase 62A, angular velocity $\omega$ increases continuously from an initial position (i.e., $\omega_0=0$) to a maximum angular velocity $\omega_{max,1}$ in an inboard-to-outboard direction of the wiper and motor. Constant speed phase 62B maintains maximum angular velocity $\omega_{max,1}$ until deceleration phase 62C, at which time angular velocity $\omega$ decreases continuously from maximum angular velocity $\omega_{max,1}$ to an outboard, resting position (i.e., $\omega_1=0$).

Similarly, speed profile 64 includes acceleration phase 64A, constant speed phase 64B, and deceleration phase 64B arranged in sequential order with respect to time. During acceleration phase 64A, angular velocity $\omega$ increases continuously from an initial, outboard position (i.e., $\omega_0=0$) to a maximum angular velocity $\omega_{max,2}$ in an outboard-to-inboard direction of the wiper and motor. Constant speed phase 64B maintains maximum angular velocity $\omega_{max,2}$ until deceleration phase 64C, at which time angular velocity $\omega$ decreases continuously from maximum angular velocity $\omega_{max,2}$ to an inboard position (i.e., $\omega_1=0$).

In some embodiments, one or more of acceleration phase 62A, deceleration phase 62C, acceleration phase 64A, and deceleration phase 64C can be characterized by constant angular acceleration rates as indicated by dashed lines 66, 68, 70, and 72, respectively. In other embodiments, speed profile 62, speed profile 64, or both can be nonlinear within one or more of acceleration phase 62A, deceleration phase 62C, acceleration phase 64A, and deceleration phase 64C.

For instance, acceleration phase 62A includes three subphases 74A, 74B, and 74C arranged in sequential order with respect to time. Increasing acceleration characterize subphases 74A and 74C, which coincide with the beginning and end of acceleration phase 62A. Subphase 74B is intermediate of subphases 74A and 74C, characterized by constant angular acceleration. In other embodiments, acceleration phase 62A can be characterized by continuously increases angular acceleration, albeit at different acceleration rates within subphases 74A, 74B, and 74C.

As depicted in FIG. 3A, deceleration phase 62C includes five subphases 76A, 76B, 76C, 76D, and 76E arranged in sequential order with respect to time. Subphase 76A begins deceleration at an initial rate that decreases as it transitions into subphase 76B. Within subphase 76B, the angular deceleration rate remains constant until deceleration rate decreases further within subphase 76C. During subphase 76D, the deceleration rate again remains constant until subphase 76E at which time the deceleration rate increases until angular velocity $\omega_0=0$.

Similar profiles are presented in FIG. 3B for speed profile 64. Acceleration phase 64A includes three subphases 78A, 78B, and 78C, each analogous to subphases 74A, 74B, and 74C of speed profile 62, albeit occurring over a short time duration and hence at different acceleration rates. Additionally, deceleration phase 64C includes five subphases 80A, 80B, 80C, 80D, and 80E analogous to subphases 76A, 76B, 76C, 76D, and 76E of speed profile 62. Again, subphases 80A-80E may occur over a shorter or longer time durations than corresponding subphases 76A-76E of speed profile 62.

The inboard-to-outboard angular velocity distribution provided by speed profile 62 can differ from the outboard-to-inboard angular velocity distribution provided by speed profile 64 due to the order in which wiper 12 traverses the contour of the windshield as well as due to external aerodynamic loads on wiper 12. During forward flight of the aircraft, air flowing over windshield 20 tends to apply torque to motor 14 via wiper 12 in the direction of rotation corresponding to inward-to-outward motion of wiper 12. Accordingly, less torque is required by motor 14. Similarly, air flowing over windshield 20 during flight tends to counteract the motor torque applied to wiper 12 for outward-to-inward travel. To counteract the influence of aerodynamic load on wiper 12, constant speed phase 62B of speed profile 62 may have a shorter duration than constant speed phase 64B of speed profile 64. Additionally, deceleration phase 62C of speed profile 62 can extend over a larger duration than acceleration phase 64A of speed profile 64. Additionally, high curvature regions of aircraft windshields tend to be located toward the outboard ends of wiper travel. As such, deceleration phase 62C of inboard-to-outboard profile 62 may require additional time duration and/or different deceleration subphases (e.g., subphases 76A-76E) to accommodate the curvature of windshield 20. Contrastingly, higher acceleration rates may be required within acceleration phase 64C of outboard-to-inboard profile 64 to overcome to accommodate the curvature of windshield 20 in the opposite direction of travel, which results in a shorter time duration relative to deceleration phase 62C.

Figure 4:
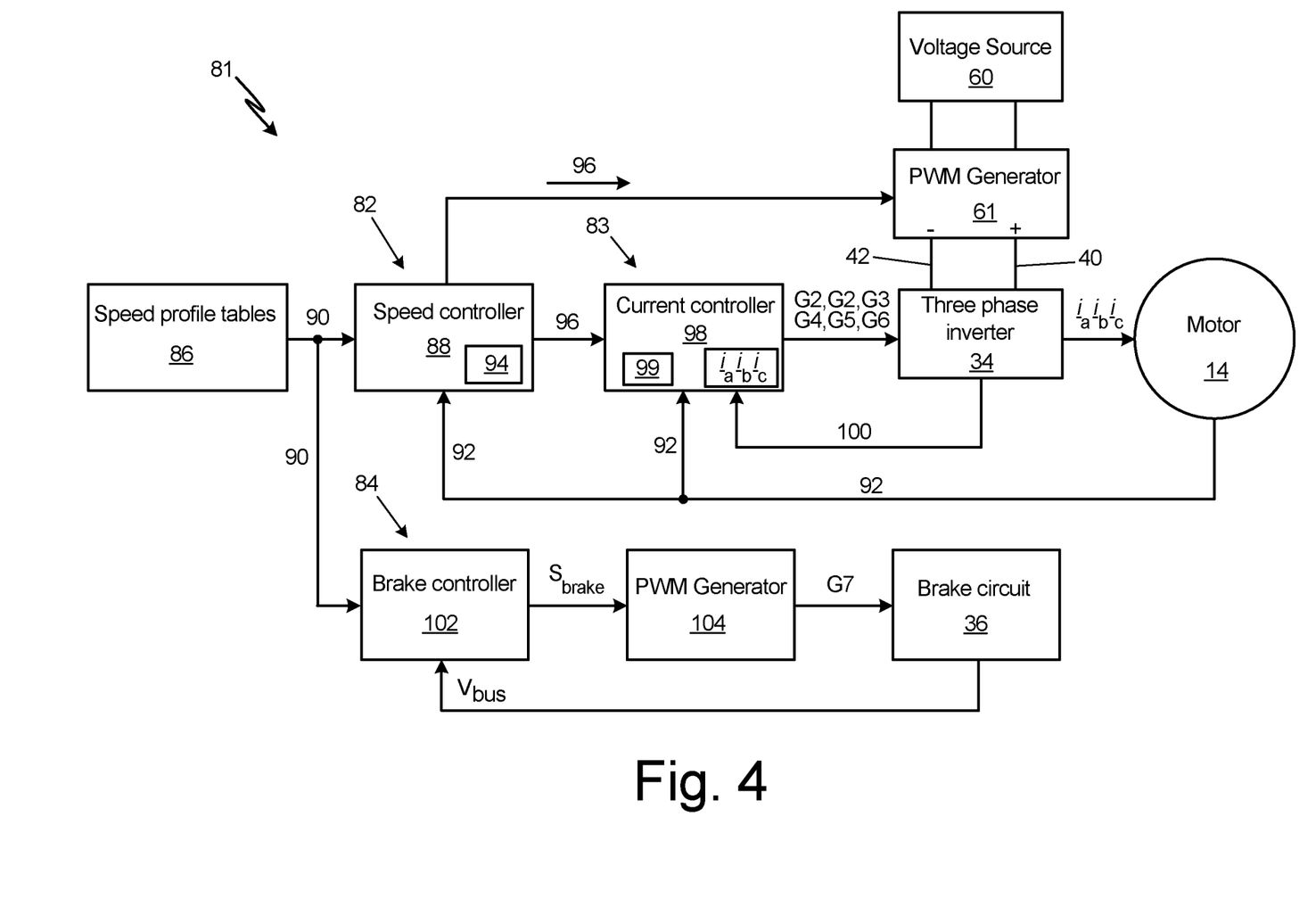
FIG. 4 is a schematic depicting a four-quadrant motor control system used for the windshield wiper system.

FIG. 4 is a schematic of controller 18 and the implementation of motor control algorithm 81 stored within system memory 30. Motor control algorithm 81 includes speed control loop 82 and current control loop 83 arranged as outer and inner control loops of motor 14, respectively. Additionally, motor control algorithm 81 includes brake control loop 84 that operates brake circuit 36 during forward braking and reverse braking conditions of windshield wiper system 10. Speed profile tables 86 store one or more speed profiles for wiper 12 and motor 14 (e.g., speed profiles 62 and 64) that provide a commanded speed to control loops 82, 83, and 84 as a function of time or position of motor 14.

Speed control loop 82 includes speed controller 88 that receives speed command 90 from speed profile tables 86 and position feedback data 92 from one or more hall sensors, or an encoder. Alternatively, position feedback data 92 can be produced using sensorless techniques. For instance, the position of motor 14 can be deduced by, for example, monitoring back-EMF of each motor phase. Speed command 90 represents the commanded speed and rotational direction of motor 14 at a given time step or rotational position of motor 14. For instance, counterclockwise rotation of motor 14, as viewed from its output shaft to wiper 12, can be represented as a positive speed value while clockwise rotation of motor 14, can be represented as a negative speed, or vice versa. Position feedback data 92 can be any digital or analog signal representative of a rotational position of motor 14 as a function of time. Upon receiving position feedback data 92, speed controller 88 determines a rotational speed, or angular velocity of motor 14 that is associated with a particular time step and/or position of motor 14. Speed controller 88 compares the motor speed determined from position feedback data 92 with speed command 90 and thereby determines speed error 94 of motor 14. Subsequently, speed controller 88 utilizes speed error 94 to generate speed correction 96 based on a proportional (P), proportional-integral (PI), or proportion-integral-derivative (PID) control scheme. Speed controller 88 outputs speed correction 96 to pulse width modulation (PWM) generator 61 to vary a target rms voltage ($V_{t,rms}$) supplied to motor 14 via positive direct current bus 40 and negative current bus 42. PWM generator 61 varies the target rms voltage by varying the duty cycle of the voltage supplied to positive direct current bus 40 and negative direct current bus 24.

Current control loop 83 include current controller 98 that receives speed correction 96 from speed controller 88, position feedback data 92, discussed above, and phase current feedback data 100. Phase feedback data 100 can be any analog or digital signal indicative of first phase current $i_a$, second phase current $i_b$, and third phase current $i_c$ of first phase 32A, second phase 32B, and third phase 32C, respectively. Initially, current controller 98 determines motor position 99 (i.e., the position of the rotor relative to the stator field of motor 14) using the position feedback data 92. Additionally, current controller 98 transforms phase currents $i_a$, $i_b$, and $i_c$ into quadrature currents $q_a$, $q_b$, and $q_c$ and direct currents $d_a$, $d_b$, and $d_c$ using a Clark and Park transformation. Subsequently, current controller 98 utilizes a proportional (P), proportional-integral (PI), or proportional-integral-derivative (PID) control scheme or schemes to output quadrature currents corrections (i.e., $\Delta q_a$, $\Delta q_b$, and $\Delta q_c$) and direct currents corrections (i.e., $\Delta d_a$, $\Delta d_b$, and $\Delta d_c$) based on speed correction 96 and motor position 99. Further, current controller 98 maximizes net quadrature current $q_{net}$ equal to the sum of phase quadrature currents $q_a$, $q_b$, and $q_c$ and minimizes net direct current $d_{net}$ equal to the sum of phase direct currents $d_a$, $d_b$, and $d_c$ in order to maximize torque applied to motor 14. Using a reverse Clark and Park transformation, quadrature current corrections (i.e., $\Delta q_a$, $\Delta q_b$, and $\Delta q_c$) and direct current corrections (i.e., $\Delta d_a$, $\Delta d_b$, and $\Delta d_c$) are transformed into first, second, and third phase current corrections (i.e., $\Delta i_a$, $\Delta i_b$, and $\Delta i_c$). Based on the first, second, and third phase corrections, current controller 98 determines gate signals G1, G2, G3, G4, G5, and G6 and outputs gate signals G1-G6 to respective high-side power switches (i.e., 44A, 44B, and 44C) and low-side power switches (46A, 46B, and 46C) of three-phase inverter 34, effectively altering the timing of gate signals G1-G6 to commutate motor 14 according to the desired speed command 90 using maximum motor torque. Speed control loop 82 and current control loop 83 repeat the foregoing process for each subsequent speed command 90 at a predetermined calculation rate.

While speed control loop 82 and current control loop 83 control the speed and commutation of motor 14, brake control loop 84 activates brake power switch 54 of brake circuit 36 during forward braking and reverse braking operation to dissipate back emf produced by motor 14 during braking operation. Brake control loop 84 includes brake controller 102 and pulse width modulation (PWM) generator 104 operatively connected to brake circuit 36. Brake controller 102 receives speed command 90 from speed profile tables 86 and direct current (DC) bus voltage Vbus measured between positive direct current bus 40 and negative current bus 42. Based on speed command 90 and DC bus voltage $V_{bus}$, brake controller 102 outputs brake signal $S_{brake}$ to PWM generator 104, which converts brake signal $S_{brake}$ into a pulse width modulated gate signal G7 delivered to brake power switch 54. Upon receiving gate signal G7, brake power switch 54 opens or closes in accordance with the duty cycle of gate signal G7. Accordingly, brake circuit 36 can be activated in proportion to the magnitude of back emf produced by motor 14 in order to maintain DC bus voltage within a target voltage range of a nominal voltage supplied in accordance with speed control loop 82.

In some examples, brake controller 102 triggers brake power switch 54 when a change in speed command 90 indicates a motor speed decrease and the DC bus voltage deviates from the target voltage commanded by speed control loop 82 by more than a threshold amount. In this instance, PWM generator 104 adjusts the duty cycle of gate signal G7 in proportion to the voltage difference between the target rms voltage ($V_{t,rms}$) output by speed controller 88 and DC bus voltage ($V_{bus}$) received by brake controller 102. Accordingly, back emf produced by motor 14 during braking operation is dissipated by resistor 52 of brake circuit 36 to maintain DC bus voltage Vbus at the target rms voltage $V_{t,rms}$ commanded by speed controller 88. Additionally, back emf from motor 14 does not propagate into voltage source 60 of the aircraft and thereby protects other aircraft systems connected to voltage source 60.

Additionally, four-quadrant control of motor 14 provided by speed control loop 82, current control loop 83, and brake control loop 84 more accurately park wiper 12. In a one-quadrant or two-quadrant motor control, frictional forces within windshield wiper system 10 and external aerodynamic loads on wiper 12 influence the parked position of wiper 12. Over time, accumulated position inaccuracy can cause wiper 12 to park in position that obstructs a pilot's field of view and/or increase aerodynamic loads on wiper 12 when not in use. By implementing the four-quadrant control techniques disclose herein, controller 18 utilizes position feedback data 92 to determine when wiper 12 has reached the parked position. The parked position of wiper 12 will be selected based on the windshield curvature, the pilot's field of view, and aerodynamic forces imposed on the wiper during flight, among other possible factors. Exemplary parked positions include positions in which wiper 12 is vertical oriented and horizontally orientated as well as an inboard position (i.e., position 22) and an outboard position (i.e., position 24).

Discussion of Possible Embodiments

The following are non-exclusive descriptions of possible embodiments of the present invention.

A windshield wiper system according to an exemplary embodiment of this disclosure, among other possible things includes a three-phase motor, a three-phase inverter, a brake circuit, and a controller. The three-phase inverter includes a positive direct current bus, a negative direct current bus, a plurality of high-side power switches, and a plurality of low-side power switches. The brake circuit includes a brake power switch and a resistor, which are connected in parallel from the positive direct current bus to the negative direct current bus. The controller is operably connected to the three-phase motor, the phase inverter, and the brake circuit. The controller includes a processor and a computer-readable memory encoded with instructions that, when executed by the processor, cause the controller to transmit first commutation signals to the high-side power switches and the low-side power switches to thereby drive the direct current motor according to a first speed profile associated with a first rotational direction of the motor. The controller transmits second commutation signals to the high-side power switches and the low-side power switches to thereby drive the direct current motor according to a second speed profile associated with a second rotational direction of the motor opposite the first rotational direction of the motor. Based on the first speed profile and a direct current (DC) bus voltage, or based on the second speed profile and the direct current (DC) bus voltage, the controller transmits a first gate signal to the brake power switch to thereby close the brake power switch.

The windshield wiper system of the preceding paragraph can optionally include, additionally and/or alternatively, any one or more of the following features, configurations and/or additional components.

A further embodiment of the foregoing windshield wiper system, wherein the first gate signal can be a first pulse-wide modulation signal that has a first duty cycle proportional to the direct current (DC) bus voltage.

A further embodiment of any of the foregoing windshield wiper systems, wherein the first speed profile can include a first acceleration phase, a first speed phase, and a first deceleration phase.

A further embodiment of any of the foregoing windshield wiper systems, wherein the second speed profile can include a second acceleration phase, a second constant speed phase, and a second deceleration phase.

A further embodiment of any of the foregoing windshield wiper systems, wherein a duration of the second constant speed phase can be greater than a duration of the first constant speed phase.

A further embodiment of any of the foregoing windshield wiper systems wherein at least one of the first acceleration phase, the first deceleration phase, the second acceleration phase, and the second deceleration phase define a nonlinear speed distribution with respect to time.

A further embodiment of any of the foregoing windshield wiper systems can further include an encoder operably connected to the motor.

A further embodiment of any of the foregoing windshield wiper systems can further include a plurality of hall sensors operably connected to the motor.

A further embodiment of any of the foregoing windshield wiper systems, wherein the computer-readable memory is encoded with instructions that, when executed by the processor, can cause the controller to determine a rotational speed of the motor based on a rotational position signal received from the encoder or the plurality of hall sensors.

A further embodiment of any of the foregoing windshield wiper systems, wherein the computer-readable memory is encoded with instructions that, when executed by the processor, can cause the controller to determine a rotational speed error based on the first speed profile or the second speed profile.

A further embodiment of any of the foregoing windshield wiper systems, wherein the computer-readable memory is encoded with instructions that, when executed by the processor, can cause the controller to vary a duty cycle of a pulse-width modulated direct current supplied to the three-phase inverter in proportion to the rotational speed error.

A further embodiment of any of the foregoing windshield wiper systems, wherein the computer-readable memory is encoded with instructions that, when executed by the processor, can cause the controller to determine a rotational position of the motor based on the rotational position signal output from the encoder, or the plurality of hall sensors.

A further embodiment of any of the foregoing windshield wiper systems, wherein the computer-readable memory is encoded with instructions that, when executed by the processor, can cause the controller to determine a first phase current, a second phase current, and a third phase current output by the three-phase inverter.

A further embodiment of any of the foregoing windshield wiper systems, wherein the computer-readable memory is encoded with instructions that, when executed by the processor, can cause the controller to determine a quadrature current and a direct current based on the first phase current, the second phase current, and the third phase current.

A further embodiment of any of the foregoing windshield wiper systems, wherein the computer-readable memory is encoded with instructions that, when executed by the processor, can cause the controller to vary the first commutation signals and the second commutation signals based on the quadrature current, the direct current, and the rotational position of the motor to maximize quadrature current and minimize direct current.

A further embodiment of any of the foregoing windshield wiper systems can further include a windshield wiper connected to an output shaft of the motor.

A further embodiment of any of the foregoing windshield wiper systems, wherein the computer-readable memory is encoded with instructions that, when executed by the processor, can cause the controller to park the windshield wiper based on the rotational position signal received from the encoder or the plurality of hall sensors.

A further embodiment of any of the foregoing windshield wiper systems, wherein the computer-readable memory is encoded with instructions that, when executed by the processor, can cause the controller to transmit the first gate signal to close the brake power switch when the first speed profile commands a first speed decrease and the direct voltage (DC) bus voltage increases above a first direct current (DC) bus voltage threshold associated with the first constant speed phase.

A further embodiment of any of the foregoing windshield wiper systems, wherein the computer-readable memory is encoded with instructions that, when executed by the processor, can cause the controller to transmit the first gate signal to close the brake power switch when the second speed profile commands a second speed decrease and the direct current (DC) bus voltage increases above a second direct current (DC) bus voltage threshold associated with the second constant speed phase.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A windshield wiper system comprising:
   a three-phase motor;
   a three-phase inverter comprising a positive direct current bus, a negative direct current bus, a plurality of high-side power switches, and a plurality of low-side power switches;
   a brake circuit connected in parallel between the positive direct current bus and the negative direct current bus, the brake circuit comprising a brake power switch and a resistor connected in series with the brake power switch;
   a controller operably connected to the three-phase motor, the three-phase inverter, and the brake circuit, the controller comprising a processor and a computer-readable memory encoded with instructions that, when executed by the processor, cause the controller to:
   transmit first commutation signals to the high-side power switches and low-side power switches to thereby drive the motor according to a first speed profile associated with a first rotational direction of the motor;
   transmit second commutation signals to the high-side power switches and low-side power switches to thereby drive the motor according to a second speed profile associated with a second rotational direction of the motor opposite the first rotational direction of the motor; and
   transmit a first gate signal to the brake power switch to thereby close the brake power switch, wherein the controller sends the first gate signal based on a DC bus voltage and the first speed profile or the second speed profile, the DC bus voltage measured between the positive direct current bus and the negative direct current bus of the three-phase inverter.

2. The windshield wiper system of claim 1, wherein the first gate signal is a first pulse-width modulation signal that has a first duty cycle proportional to the DC bus voltage.

3. The windshield wiper system of claim 2, wherein the first speed profile includes a first acceleration phase, a first constant speed phase, and a first deceleration phase.

4. The windshield wiper system of claim 3, wherein the second speed profile includes a second acceleration phase, a second constant speed phase, and a second deceleration phase.

5. The windshield wiper system of claim 4, wherein a duration of the second constant speed phase is greater than a duration of the first constant speed phase.

6. The windshield system of claim 4, wherein at least one of the first acceleration phase, the first deceleration phase, the second acceleration phase, and the second deceleration phase define a nonlinear speed distribution with respect to time.

7. The windshield wiper system of claim 1, further comprising:

an encoder operably connected to the motor, wherein the computer-readable memory is encoded with instructions that, when executed by the processor, cause the controller to determine a rotational speed of the motor based on a rotational position signal received from the encoder.

8. The windshield wiper system of claim 7, wherein the computer-readable memory is encoded with instructions that, when executed by the processor, cause the controller to determine a rotational speed error based on the first speed profile or the second speed profile and the rotational speed of the motor.

9. The windshield wiper system of claim 8, wherein the computer-readable memory is encoded with instructions that, when executed by the processor, cause the controller to vary a duty cycle of a pulse-width modulated direct current supplied to the three-phase inverter in proportion to the rotational speed error.

10. The windshield wiper system of claim 9, wherein the computer-readable memory is encoded with instructions that, when executed by the processor, cause the controller to determine a rotational position of the motor based on the rotational position signal output from the encoder.

11. The windshield wiper system of claim 10, wherein the computer-readable memory is encoded with instructions that, when executed by the processor, cause the controller to:

determine a first phase current, a second phase current, and a third phase current output by the three-phase inverter; and determine a quadrature current and a direct current based on the first phase current, the second phase current, and the third phase current.

12. The windshield wiper system of claim 11, wherein the computer-readable memory is encoded with instructions that, when executed by the processor, cause the controller to vary the first commutation signals and the second commutation signals based on the quadrature current, the direct current, and the rotational position of the motor to maximize quadrature current and minimize direct current.

13. The windshield wiper system of claim 12, further comprising:

a windshield wiper connected to an output shaft of the motor; and wherein the computer-readable memory is encoded with instructions that, when executed by the processor, cause the controller to park the windshield wiper based on the rotational position signal received from the encoder.

14. The windshield wiper system of claim 1, wherein the computer-readable memory is encoded with instructions that, when executed by the processor, cause the controller to transmit the first gate signal to close the brake power switch when the first speed profile commands a first speed decrease and the DC bus voltage increases above a first DC bus voltage threshold associated with the first constant speed phase or when the second speed profile commands a second speed decrease and the DC bus voltage increases above a second DC bus voltage threshold associated with the second constant speed phase.

* * * * *